(No Model.) 2 Sheets—Sheet 1.

J. H. McGRADY.
SUPPORTING ATTACHMENT FOR BICYCLES.

No. 583,656. Patented June 1, 1897.

Witnesses:
A. D. Harrison
P. W. Pizzetti

Inventor:
J. H. McGrady
by Wright Brown & Quinby
Attys.

THE NORRIS PETERS CO., PHOTO-LITHO., WASHINGTON, D. C.

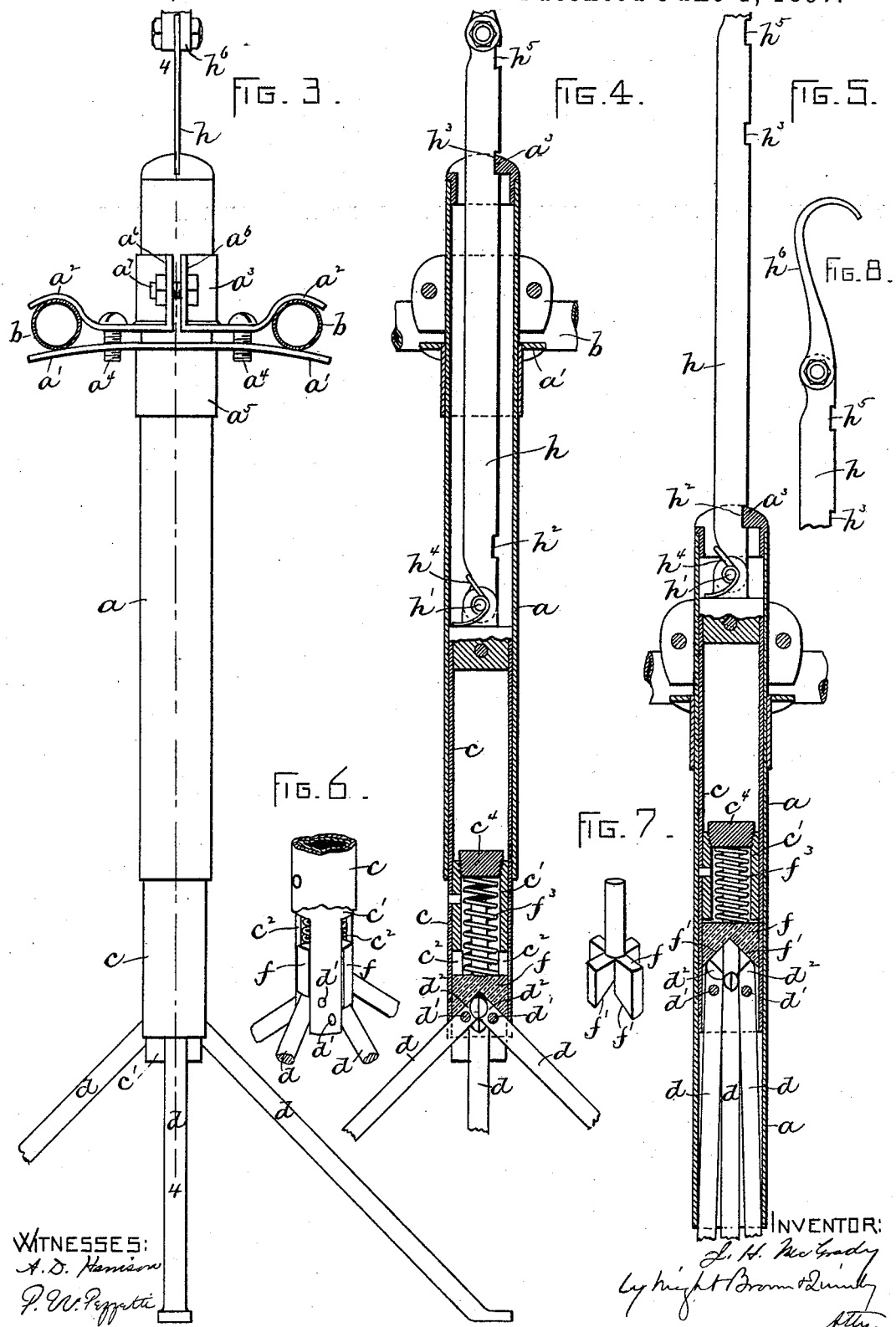

UNITED STATES PATENT OFFICE.

JOHN H. McGRADY, OF BOSTON, MASSACHUSETTS.

SUPPORTING ATTACHMENT FOR BICYCLES.

SPECIFICATION forming part of Letters Patent No. 583,656, dated June 1, 1897.

Application filed May 25, 1896. Serial No. 592,907. (No model.)

*To all whom it may concern:*

Be it known that I, JOHN H. MCGRADY, of Boston, in the county of Suffolk and State of Massachusetts, have invented certain new and useful Improvements in Supporting Attachments for Bicycles, of which the following is a specification.

This invention has for its object to provide a simple and effective attachment, of minimum weight, adapted to be applied to a bicycle for the purpose of supporting the same in an upright position when not in use.

The invention consists in the improved construction which I will now proceed to describe and claim.

Figure 1:
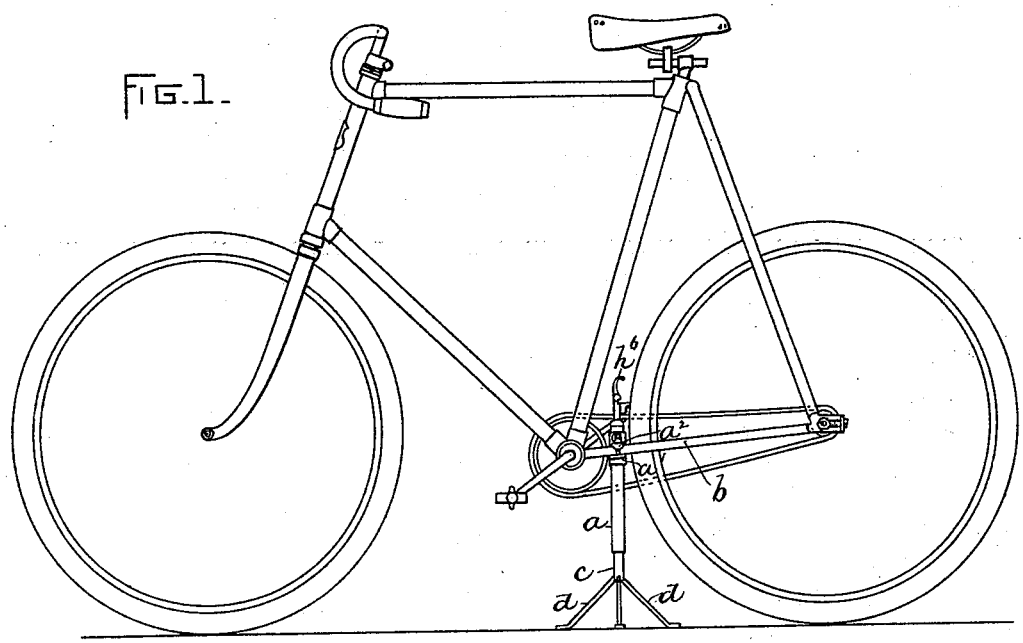
Figure 2:
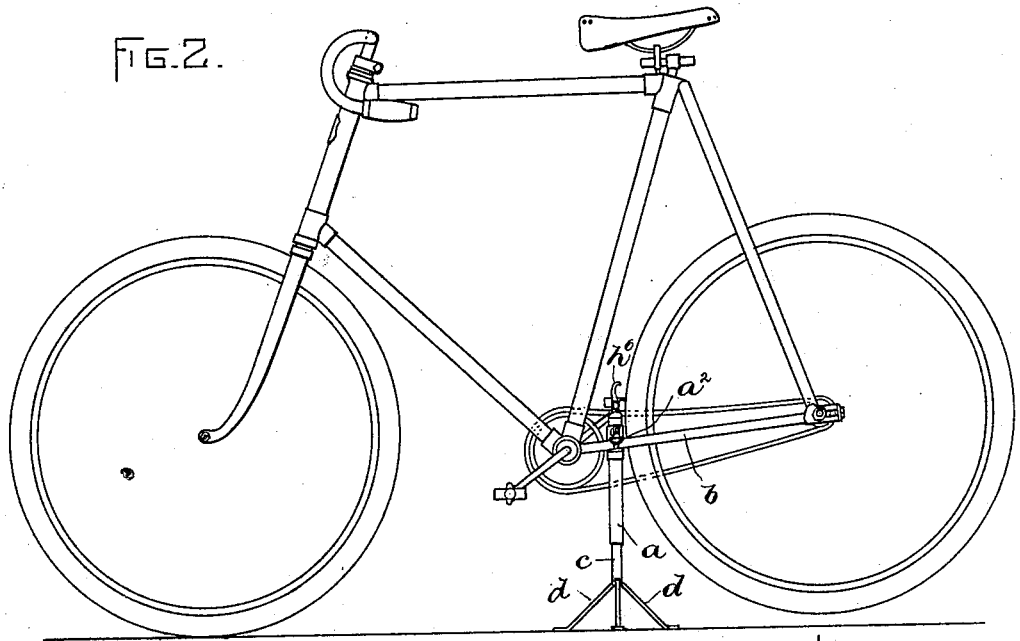

Of the accompanying drawings, forming a part of this specification, Figure 1 represents a side elevation of a bicycle having my improved attachment adjusted to support the bicycle. Fig. 2 represents a view showing the invention adapted to support the bicycle with one wheel raised from the floor. Fig. 3 represents a side elevation showing the attachment clamped to a portion of the frame of a bicycle, the latter being shown in section. Fig. 4 represents a section on line 4 4 of Fig. 3. Fig. 5 represents a view similar to Fig. 4, showing the device folded. Figs. 6, 7, and 8 represent detail views hereinafter referred to.

The same letters of reference indicate the same parts in all the figures.

In the drawings, $a$ represents a tubular holder, the upper portion of which is provided with means whereby the holder may be clamped to the rods $b\,b$ of a bicycle-frame, said rods extending from the crank-axle bearing to the axle of the rear wheel. The means here shown for securing the holder $a$ to the rods $b\,b$ are two pairs of arms $a'\,a^2$. The arms $a'$ are formed in one piece, which is affixed to a sleeve $a^5$, loosely mounted on the holder $a$. The arms $a^2$ are formed on a sleeve $a^3$, which embraces the holder and is adapted to be adjustably secured thereto. The outer ends of said arms are formed to grasp the rods $b\,b$, as clearly shown in Fig. 3. The sleeve $a^3$ is made in sections, having ears $a^6$, connected by screws $a^7$, so that said sleeve may be securely clamped upon the holder $a$. The arms $a^2$ are affixed to the sections of the sleeve $a^3$. The plate $a'$ and its sleeve $a^5$ are loose on the holder $a$, and said plate is connected with the plate $a^2$ by means of screws $a^4\,a^4$. By adjusting said screws the plates can be caused to grasp or release the rods $b\,b$, as will be readily seen. Any other suitable clamping means may be employed for this purpose, my invention not being limited to the means above described.

The holder $a$ extends considerably below the clamping devices, as shown in Fig. 1.

$c$ represents a tubular plunger, which is fitted to slide in the holder $a$. In the lower end of the plunger is affixed a sleeve or reinforcement $c'$, having longitudinal slots $c^2$. $d\,d$ are a series of levers, each pivotally connected by a pin $d'$ with the sleeve $c'$, the levers being located in the slots $c^2$, across which the pivot-pins extend, as indicated by dotted lines in Fig. 6. The longer arms of the levers $d$ project downwardly from the pivots $d'$ and constitute braces. The levers have shorter arms $d^2$, projecting above the pivots, as shown in Figs. 5 and 6. Said shorter arms are acted on by inclined faces $f'$, formed on a block $f$, which is fitted to slide in the sleeve $c'$ and is pressed downwardly by a spring $f^3$, interposed between the block $f$ and a cap or plug $c^4$, affixed to the sleeve $c'$.

When the levers $d$ are moved to the position shown in Fig. 5, their shorter arms $d^2$ force the block $f$ upwardly against the pressure of the spring $f^3$, the latter yielding. This result takes place when the plunger $c$ is raised in the holder $a$ sufficiently to draw the longer arms of the levers into said holder, as shown in Fig. 7, the levers being thus raised from the floor or ground and stored compactly in the holder. When the plunger is moved downwardly far enough to project the longer arms of the levers from the holder $a$, the spring $f^3$ presses the block $f$ downwardly on the shorter arms $f'$, thus forcing the shorter arms inwardly and the longer arms outwardly, the longer arms being thus caused to serve as braces, arranged to support the bicycle in an upright position.

The plunger may be held in the position shown in Fig. 4 by means of a latch $h$, which is a rod or bar pivoted at $h'$ to an ear on the upper end of the plunger $c$ and provided with two notches $h^2\,h^3$, by means of which it may be engaged with a detent $a^3$ at the upper end of the holder $a$, the notch $h^2$ being engaged with said detent to hold the plunger and levers in their raised position, as shown in Fig. 5, while the notch $h^3$ is engaged with the detent to hold the plunger and levers depressed, as shown in Fig. 4. The latch $h$ is preferably extended upwardly far enough to receive a third notch $h^5$, adapted to lock the plunger $c$ and levers $d$ at a lower point, so that the levers will support the bicycle with one wheel raised from the floor or ground, as shown in Fig. 2, for convenience in cleaning. A spring $h^4$ presses the latch in the direction required to hold its notches in engagement with the detent $a^3$. The upper end of the latch $h$ is here shown as provided with a hooked finger-piece or handle $h^6$ for convenience in operating the device.

Owing to the adjustability of the sleeve on the tubular holder and the fact that the clamp-arms project from the two sides thereof the device is adapted to fit varying sizes and shapes of bicycle-frames and to be attached to and between the two bars of the frame-fork behind the crank-axle, as shown in Figs. 1 and 2. This location permits of the device being used as a permanent attachment with the least liability of interference with the freedom of movement of the feet or limbs of the rider.

I claim—

1. A supporting attachment for bicycles, comprising a tubular holder provided with means whereby it may be clamped to the frame of a bicycle, a slide or plunger movable in said holder, a series of levers pivoted to said slide and having downwardly-projecting longer arms and upwardly-projecting shorter arms, and a spring-pressed block movable with said plunger and having an independent yielding movement said block having also a series of inclined faces which bear yieldingly on the shorter arms of the levers and normally force the longer arms of said levers outwardly.

2. A supporting attachment for bicycles, comprising a tubular holder provided with means whereby it may be clamped to the frame of a bicycle, a slide or plunger movable in said holder, a series of levers pivoted to said slide and having longer arms projecting below the pivots, and shorter arms projecting above the pivots, a spring-pressed block movable with said plunger and also movable independently thereof, said block having a series of inclined faces which bear yieldingly on the shorter arms of the levers and normally force the longer arms outwardly, and an upwardly-projecting latch pivoted to the plunger and having notches formed to engage the holder in different positions.

In testimony whereof I have signed my name to this specification, in the presence of two subscribing witnesses, this 18th day of May, A. D. 1896.

JOHN H. McGRADY.

Witnesses:
STEPHEN PORTER,
C. F. BROWN.